United States Patent
Oshio et al.

(10) Patent No.: US 8,985,283 B2
(45) Date of Patent: Mar. 24, 2015

(54) VEHICLE BRAKE APPARATUS

(75) Inventors: Yusuke Oshio, Kariya (JP); Takahisa Yokoyama, Anjo (JP); Akira Sakai, Toyota (JP); Naoki Yabusaki, Toyota (JP); Shinsuke Yamamoto, Anjo (JP)

(73) Assignees: Advics Co., Ltd., Kariya-Shi, Aichi (JP); Toyota Jidosha Kabushiki Kaisha, Toyota-Shi, Aichi (JP)

(*) Notice: Subject to any disclaimer, the term of this patent is extended or adjusted under 35 U.S.C. 154(b) by 285 days.

(21) Appl. No.: 13/574,116

(22) PCT Filed: Feb. 24, 2011

(86) PCT No.: PCT/JP2011/054183
§ 371 (c)(1),
(2), (4) Date: Jul. 19, 2012

(87) PCT Pub. No.: WO2011/105512
PCT Pub. Date: Sep. 1, 2011

(65) Prior Publication Data
US 2012/0285777 A1     Nov. 15, 2012

(30) Foreign Application Priority Data
Feb. 24, 2010    (JP) .................................. 2010-03920

(51) Int. Cl.
*F16D 55/08* (2006.01)
*B60T 13/74* (2006.01)
(Continued)

(52) U.S. Cl.
CPC .................. *B60T 13/741* (2013.01); *B60T 8/00* (2013.01); *B60T 8/3255* (2013.01);
(Continued)

(58) Field of Classification Search
USPC ............... 188/72.1, 73.37, 73.35, 73.36, 156, 188/162, 1.11 E; 303/191, 195; 310/77; 701/70
See application file for complete search history.

(56) References Cited

U.S. PATENT DOCUMENTS 6,378,669 B1    4/2002    Kurasako et al.
6,988,595 B2*   1/2006    Kamiya et al. ............... 188/72.1
(Continued)

FOREIGN PATENT DOCUMENTS

JP     2000-283193 A     10/2000
JP     2001018772 A *    1/2001
(Continued)

OTHER PUBLICATIONS

International Search Report (PCT/ISA/210) issued on May 24, 2011, by the Japanese Patent Office as the International Searching Authority for International Application No. PCT/JP2011/054183.
(Continued)

*Primary Examiner* — Thomas J Williams
*Assistant Examiner* — Mariano Sy
(74) *Attorney, Agent, or Firm* — Buchanan Ingersoll & Rooney PC

(57) ABSTRACT

A vehicle brake apparatus capable of preventing abnormal vibration due to thickness variations in a disc rotor includes a motor drive unit configured to control the motor which presses the brake pad against the disc rotor, a brake pressure detection unit for detecting a braking pressure for pressing the brake pad, and a wheel speed sensor for detecting a rotation speed of the disc rotor. If an amount of variation in the detection values detected by the brake pressure detection unit during one rotation of the disc rotor exceeds a variation amount determination threshold value and a detection value variation frequency has a correlation with the rotation speed of the disc rotor and the detection value variation frequency exceeds a variation frequency determination threshold value, the motor drive unit controls the motor in inverted phase to the variation in the detection values.

8 Claims, 5 Drawing Sheets

(51) Int. Cl.
  *B60T 8/00* (2006.01)
  *B60T 8/32* (2006.01)
  *F16D 65/00* (2006.01)
  *F16D 65/12* (2006.01)
  *F16D 121/24* (2012.01)

(52) U.S. Cl.
  CPC ....... *F16D 65/0006* (2013.01); *F16D 65/0012* (2013.01); *F16D 65/12* (2013.01); *B60T 2201/024* (2013.01); *F16D 2121/24* (2013.01)
  USPC ...... 188/72.1; 188/1.11 E; 188/156; 188/162; 188/73.37; 303/191

(56) References Cited

U.S. PATENT DOCUMENTS

| | | | | |
|---|---|---|---|---|
| 8,020,653 | B2* | 9/2011 | Mizutani et al. | 180/65.51 |
| 8,219,283 | B2* | 7/2012 | Recker et al. | 701/41 |
| 8,265,846 | B2* | 9/2012 | Kinser et al. | 701/70 |
| 8,336,969 | B2* | 12/2012 | Sano et al. | 303/191 |
| 2004/0183366 | A1* | 9/2004 | Kamiya et al. | 303/11 |

FOREIGN PATENT DOCUMENTS

| | | | |
|---|---|---|---|
| JP | 2001-130393 A | 5/2001 | |
| JP | 2005-306222 A | 11/2005 | |

OTHER PUBLICATIONS

Written Opinion (PCT/ISA/237) issued on May 24, 2011, by the Japanese Patent Office as the International Searching Authority for International Application No. PCT/JP2011/054183.

Notification of Transmittal of Translation of the International Preliminary Report on Patentability mailed on Sep. 27, 2012 and International Preliminary Report on Patentability issued Sep. 18, 2012 by The International Bureau of WIPO.

* cited by examiner

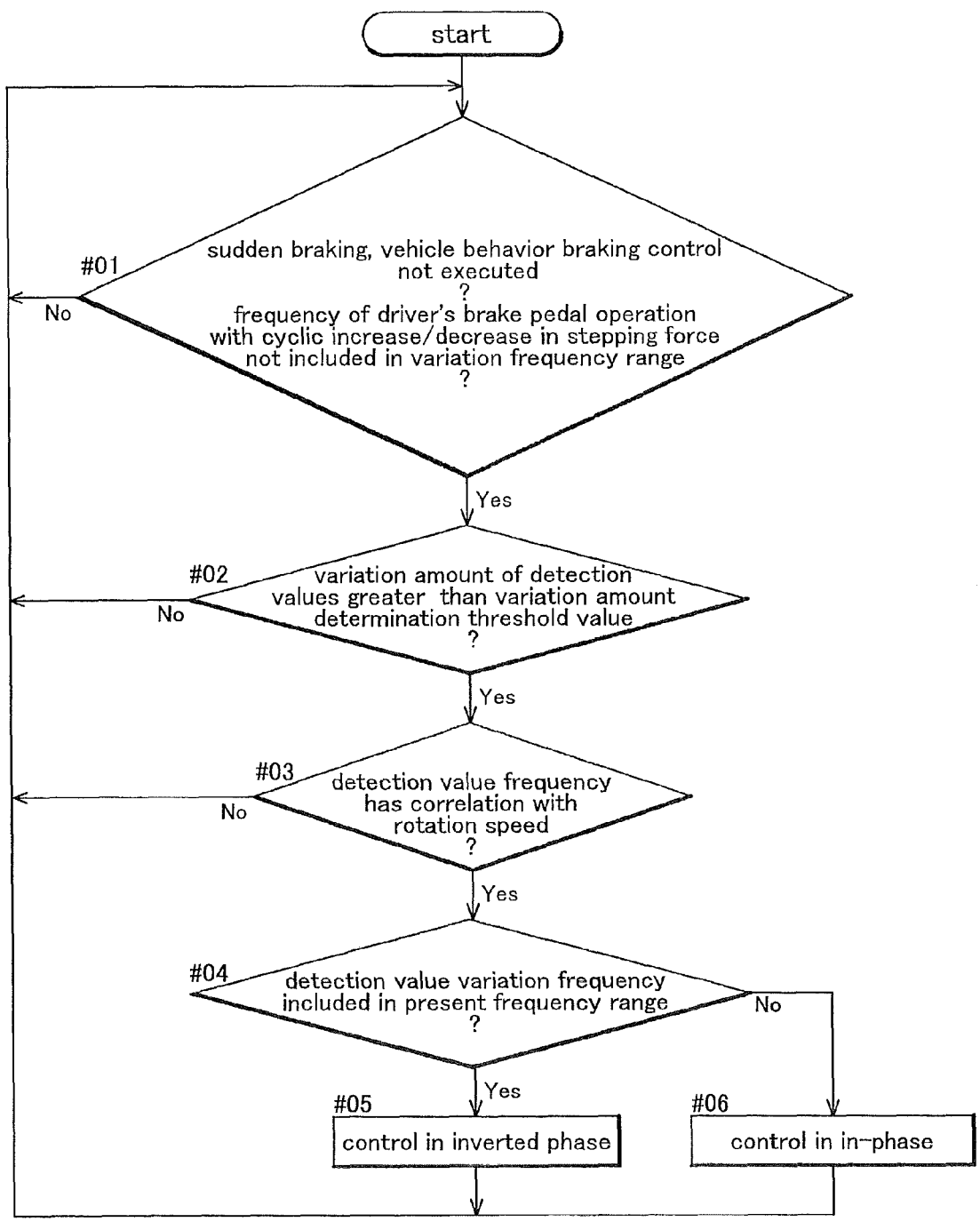

VEHICLE BRAKE APPARATUS

TECHNICAL FIELD

The present invention relates to a vehicle brake apparatus comprising: a disc rotor mounted to be rotatable in unison with a wheel provided in a vehicle; a caliper fixed to a fixing member of the vehicle and including a brake pad movable along a rotor axis direction of the disc rotor; a drive mechanism for moving the brake pad by a drive force of a motor along the rotor axis direction to press the brake pad against the disc rotor; a motor controlling means for controlling the motor for pressing the brake pad against the disc rotor; a brake pressure detecting means for detecting at least one of a pressing force for pressing the brake pad against the disc rotor or a load applied to the brake pad when the brake pad is pressed against the disc rotor; and a rotation speed detecting means for detecting a rotation speed of the disc rotor.

BACKGROUND ART

Conventionally, there has been employed a vehicle brake apparatus for applying a braking force to a vehicle by pressing, by a motor, a brake pad mounted within a caliper against a disc rotor which is mounted to be rotatable in unison with a wheel. With this type of vehicle brake apparatus, in case the thickness of the disc rotor is not uniform along the peripheral direction of the disc rotor, there would occur a problem that the vehicle will be vibrated (abnormal vibration) due to variation that occurs in the braking torque in association with the disc rotor rotation when the brake pad is pressed against the disc rotor. As a technique to prevent occurrence of such abnormal vibration, there is a technique disclosed in a source identified below (e.g. Patent Document 1).

With an abnormal vibration preventing apparatus for an electric powered brake described in Patent Document 1, the apparatus includes an electric powered caliper drive device, a braking torque variation frequency detecting means for detecting a variable frequency of the braking torque or a caliper pressing force variation frequency detecting means for detecting a variation frequency of the caliper pressing force; and a speed variation frequency detecting means for detecting a wheel speed. According to this abnormal vibration preventing apparatus for an electric powered brake, if an output from the braking torque variation frequency detecting means or the output from the caliper pressing force variation frequency detecting means is greater than a reference value and this variation frequency is in proportion with the speed variation frequency, the electric powered caliper drive apparatus is controlled in inverted phase to the output variation. With this, the brake pad is controlled in its movement in such a manner as to cancel out the vibration, thus restricting the abnormal vibration.

PRIOR ART DOCUMENT

Patent Document

Patent Document 1: Japanese Unexamined Patent Application Publication No. 2000-283193

SUMMARY OF THE INVENTION

Problem to be Solved by Invention

With the abnormal vibration preventing apparatus for an electric powered brake described in Patent Document 1, whenever an output from the braking torque variation frequency detecting means or the caliper pressing force variation frequency detecting means is greater than a reference value and this variation frequency is in proportion with the speed variation frequency, the disc rotor is always operated for pressing the brake pad in inverted phase to the output. Therefore, there occurs increased consumption of power by the motor for pressing the brake pad against the disc rotor. Further, as the operational period of the motor is prolonged, there is the possibility of the motor per se wearing quickly. Moreover, in case the variation frequency of the output is high, it is necessary to effect the movement control of the brake pad in the inverted phase at a high frequency also, so that a motor having a good response becomes needed. As a result, there arises a need for an expensive motor, which need in turn leads to incurrence of high manufacture cost, another problem.

In view of the above-described problems, the object of the present invention is to provide a vehicle brake apparatus capable of preventing abnormal vibration due to thickness variations in a disc rotor, yet restricting electric power consumption and wear of a motor for moving a brake pad at the same time.

Means for Achieving the Object

For achieving the above-noted object, according to the characterizing feature of a vehicle brake apparatus relating to the present invention, the apparatus comprises:

a disc rotor mounted to be rotatable in unison with a wheel provided in a vehicle;

a caliper fixed to a fixing member of the vehicle and including a brake pad movable along a rotor axis direction of the disc rotor;

a drive mechanism for moving the brake pad by a drive force of a motor along the rotor axis direction to press the brake pad against the disc rotor;

a motor controlling means for controlling the motor for pressing the brake pad against the disc rotor;

a brake pressure detecting means for detecting at least one of a pressing force for pressing the brake pad against the disc rotor or a load applied to the brake pad when the brake pad is pressed against the disc rotor; and a rotation speed detecting means for detecting a rotation speed of the disc rotor;

wherein if a variation amount in detection values detected by said brake pressure detecting means during one rotation of the disc rotor exceeds a preset variation amount determination threshold value and a detection value variation frequency relating to the variation in the detection values has a correlation with the rotation speed detected by said rotation speed detecting means and the detection value variation frequency exceeds a preset variation frequency determination threshold value, said motor controlling means effects a vibration restricting control for controlling the motor in inverted phase to the variation in the detection values.

With the above-described characterizing arrangement, in case the detection value variation frequency is within a frequency range where e.g. a crew of the vehicle feels it as abnormal vibration, it is possible to control the motor in the inverted phase to the detection value variation, thereby to prevent abnormal vibration. Therefore, it is possible to appropriately prevent the vehicle crew from feeling abnormal vibration. Further, it is also possible to make such a setting that the inverted phase control of the motor to the detection value variation is not executed if the detection value variation frequency is not greater than a preset variation frequency determination threshold value. With this, the power consumption for driving the motor and wear of the motor can be restricted.

Preferably, said variation frequency determination threshold value is provided as a first variation frequency determination threshold value; and said motor controlling means is configured to execute said vibration restricting control only if said detection value variation frequency is lower than a second variation frequency determination threshold value which is preset to be greater than said first variation frequency determination threshold value.

With the above-described arrangement, the inverted phase motor control is not executed in case the detection value variation frequency is within a high frequency range where e.g. the vehicle crew does not feel it as abnormal vibration. So, that the reduction in power consumption is made possible. And, wear of the motor can be restricted as well. Moreover, there is no need to execute motor control at a high frequency, it is not necessary to employ a motor having good response. Consequently, an inexpensive motor can be used, and the vehicle brake apparatus can be realized at lower costs.

Further preferably, said vibration restricting control executed by said motor controlling means includes control for controlling the motor in in-phase to the detection value variation in an entirety or a part of a range where said detection value variation frequency is smaller than said variation frequency determination threshold value, provided said variation amount is greater than said variation amount determination threshold value and said detection value variation frequency has a correlation with said rotational speed.

With the above-described arrangement, in case e.g. the detection value variation frequency is within a low frequency range where the vehicle crew does not feel it as abnormal vibration, it is possible to control the motor in in-phase to the detection value variation. With this, it becomes possible to positively trim a thicker portion of the disc rotor, whereby thickness variation relative to the peripheral direction of the disc rotor can be reduced. Consequently, it become possible to restrict occurrence of abnormal vibration due to thickness variations in the disc rotor.

Further preferably, said variation frequency determination threshold value is provided as first variation frequency determination threshold value; and said vibration restricting control executed by said motor controlling means includes control for controlling the motor in in-phase to the detection value variation in an entirety or a part of a range where said detection value variation frequency exceeds a second variation frequency determination threshold value which is preset to be greater than said first variation frequency determination threshold value, provided said variation amount is greater than said variation amount determination threshold value and said detection value variation frequency has a correlation with said rotational speed.

With the above-described arrangement, in case e.g. the detection value variation frequency is within a high frequency range where the vehicle crew does not feel it as abnormal vibration, it is possible to control the motor in the in-phase phase to the detection value variation. With this, it becomes possible to positively trim a thick portion of the disc rotor, whereby thickness variation relative to the peripheral direction of the disc rotor can be reduced. Consequently, it become possible to restrict occurrence of abnormal vibration due to thickness variations in the disc rotor.

Preferably, said motor controlling means is configured to inhibit said vibration restricting control in case any one of a sudden braking, a vehicle behavior braking control, or a brake pedal operation by a driver with cyclic increase/decrease in the stepping force is effected.

A sudden braking for a vehicle is an emergency situation. Therefore, according to the above-described arrangement, if a sudden braking is effected, the motor controlling means does not execute the control in response to the detection value variation, so that stopping of the vehicle may be carried out with priority. Further, if a vehicle behavior braking control (e.g. an ABS control, an anti-skid control, a traction control, a pre-crush control, etc.) is effected, the motor controlling means inhibits the vibration restricting control, so that returning of the vehicle behavior to a stable condition or securement of safety may be carried out with priority. Still further, in case the detection value variation exceeds the variation amount determination threshold value and the detection value variation frequency has a correlation with the rotational speed, due to a brake pedal operation by a driver with cyclic increase/decrease in the stepping force is effected (e.g. a braking operation involving stepping force increase and decrease or a pumping braking operation intentionally effected by the driver) and the detection value variation frequency has a predetermined relationship relative to a preset determination threshold value, the vibration restricting control is inhibited also. As the vibration restricting control is inhibited, there is effected no braking force control at a frequency different from the driver's intension. Therefore, it is possible to maintain the braking force corresponding to the braking operation intended by the driver. Further, as the motor controlling means does not effect the control for the detection value variation, as needed, the power consumption for driving the motor and the wear of the motor can be restricted.

MODE OF EMBODYING THE INVENTION

Figure 1:
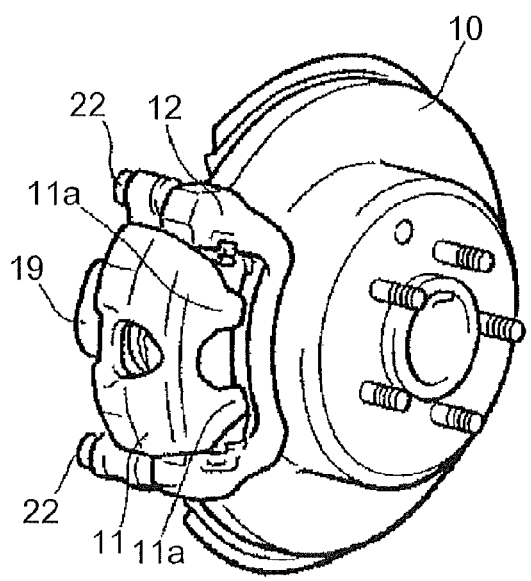
[FIG. 1] is a view showing a disc rotor and a caliper of a vehicle brake apparatus,
[FIG. 2] is a section view showing a section of the caliper,
[FIG. 3] is a block diagram schematically showing the vehicle brake apparatus,
[FIG. 4] is a view illustrating amplitude and cycle of detection values,
[FIG. 5A] is view illustrating an inverted phase control,
[FIG. 5B] is view illustrating an inverted phase control,
[FIG. 6A] is a view illustrating an in-phase control,
[FIG. 6B] is a view illustrating an in-phase control,
[FIG. 7A] is a view illustrating the in-phase control and the inverted phase control by the vehicle brake apparatus,
[FIG. 7B] is a view illustrating the in-phase control and the inverted phase control by the vehicle brake apparatus, and
[FIG. 8] is a flowchart illustrating control by the vehicle brake apparatus.

Next, an embodiment of the present invention will be described with reference to the accompanying drawings. A vehicle brake apparatus 100 relating to the present invention has functions of preventing abnormal vibration due to thickness variations in a disc rotor 10 and reducing thickness variation. FIG. 1 shows the disc rotor 10 and a caliper 11 of the vehicle brake apparatus 100 (see FIG. 3). The disc rotor 10 is mounted to be rotatable in unison with a wheel (not shown) provided in the vehicle. Therefore, there exists one-to-one relationship between the rotational speed of the disc rotor 10 and the rotational speed of the wheel, and detection of either one rotational speed allows specification (identification) of the other rotational speed. In the instant embodiment, detection of the rotational speed of the disc rotor 10 is effected by a wheel speed sensor 33 to be described later.

The caliper 11 is fixed to a fixing member 12 of the vehicle and a brake pad 13 is mounted to be movable along the rotor axis direction of the disc rotor 10. The fixing member 12 of the vehicle can be the body of the vehicle per se or can be a member fixed to the vehicle body such as one shown in FIG. 1. The rotor axis direction of the disc rotor 10 refers to the axial direction of the disc rotor 10 and corresponds to the axis of the wheel described above. The caliper 11 has a cross section having one-side omitted rectangular shape (see FIG. 2) and the caliper 11 is movably supported to the fixing member 12 via a slide pin 22.

Figure 2:
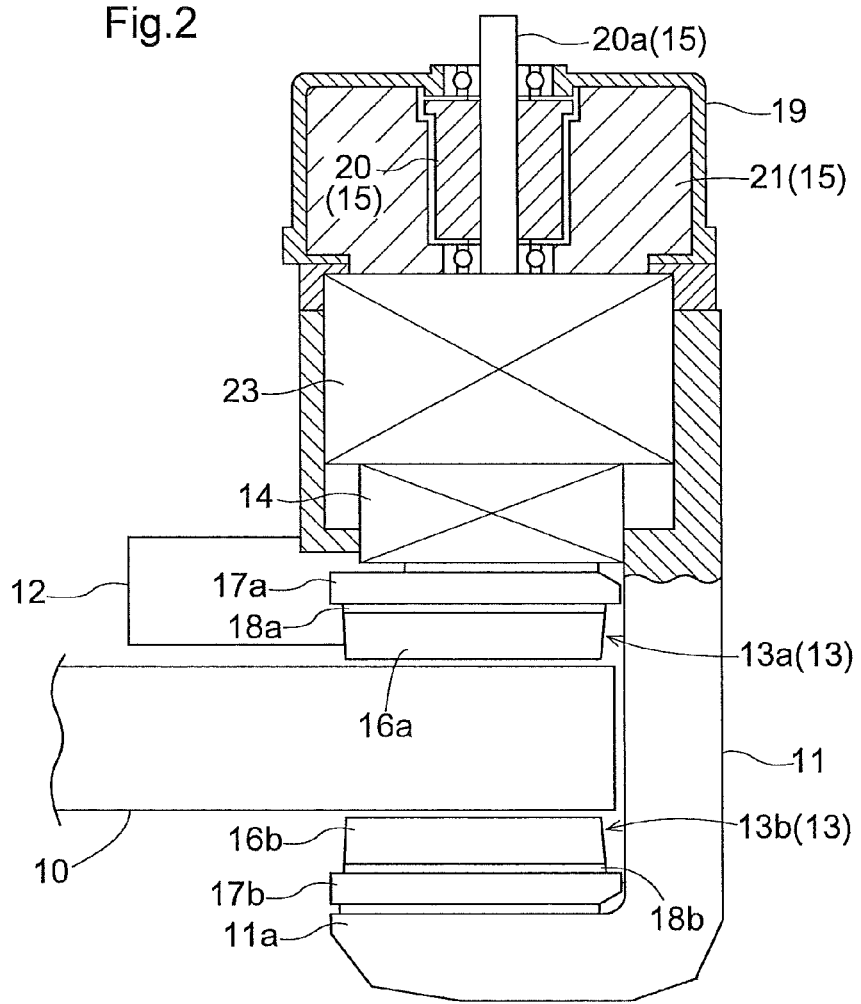

FIG. 2 shows the cross section of the caliper 11. As shown in FIG. 2, on the opposed sides of the axis direction of the disc rotor 10, there are provided brake pads 13. The brake pads 13 consist of a pair of brake pads 13a, 13b. The brake pad 13a provided on one side of the axis direction of the disc rotor 10 is mounted to a drive mechanism 14 (to be described later) and the brake pad 13b provided on the other side of the axis direction of the disc rotor 10 is mounted to a pawl portion 11a of the caliper 11. The brake pads 13a, 13b are fixed such that the respective pads 13, 13b are movable only along the axis direction of the disc rotor 10.

The brake pads 13a, 13b are comprised of friction members 16a, 16b which are frictionally engaged with the disc rotor 10 to be slidable relative thereto and back plates 17a, 17b which hold the friction members 16a, 16b. Further, between the friction members 16a, 16b and the back plates 17a, 17b, there are provided heat insulating members 18a, 18b for restricting conduction of heat generated in the respective friction members 16a, 16b to the caliper 11.

The drive mechanism 14 is configured to move the brake pads 13 by a drive force of a motor 15 along the rotor axis direction to cause them to be pressed against the disc rotor 10. As the brake pads 13 are pressed against the disc rotor 10 from the opposed sides of the axis direction, a braking force can be applied to the wheel. In this way, the drive mechanism 14 utilizes the motor 15 as the power source for its movement.

The motor 15 is housed within a motor housing 19 which is fixed to one terminal end of the caliper 11. The motor 15 includes a rotor 20 and a stator 21. The rotor 20 includes a permanent magnet (not shown) and is supported within the motor housing 19 to be rotatable about a rotor axis 20a as the axis of its rotation. The stator 21 is fixed to the inner peripheral face of the motor housing 19 and a wire is wound about it to form a stator coil (not shown). Upon power supply to this stator coil, the rotor 20 is rotated so that the motor 15 outputs a rotational power. This rotational power is converted by a linear movement converting means 23 into a pressing force for pressing the brake pads 13. This linear movement converting means 23 is comprised of e.g. a plurality of gears. But, as this is a known technique, explanation thereof will be omitted.

The caliper 11 comprises a so-called floating type caliper. In operation, in response to e.g. a braking operation by the vehicle driver or an automatic braking control by a traction control or a skid restricting control, etc., the motor 15 is driven, so that the resultant rotational force outputted from the motor 15 presses one brake pad 13a against the rotor 10. In response to a reaction force to this pressing force (a reaction force to the pressing force), the caliper 11 is moved via the slide pin 22 and the other brake pad 13b is pulled in by the pawl portion 11a of the caliper 11 and the disc rotor 10 is clamped and pressed from the opposed sides in the axis direction. With this, a braking force is applied to the wheel.

Figure 3:
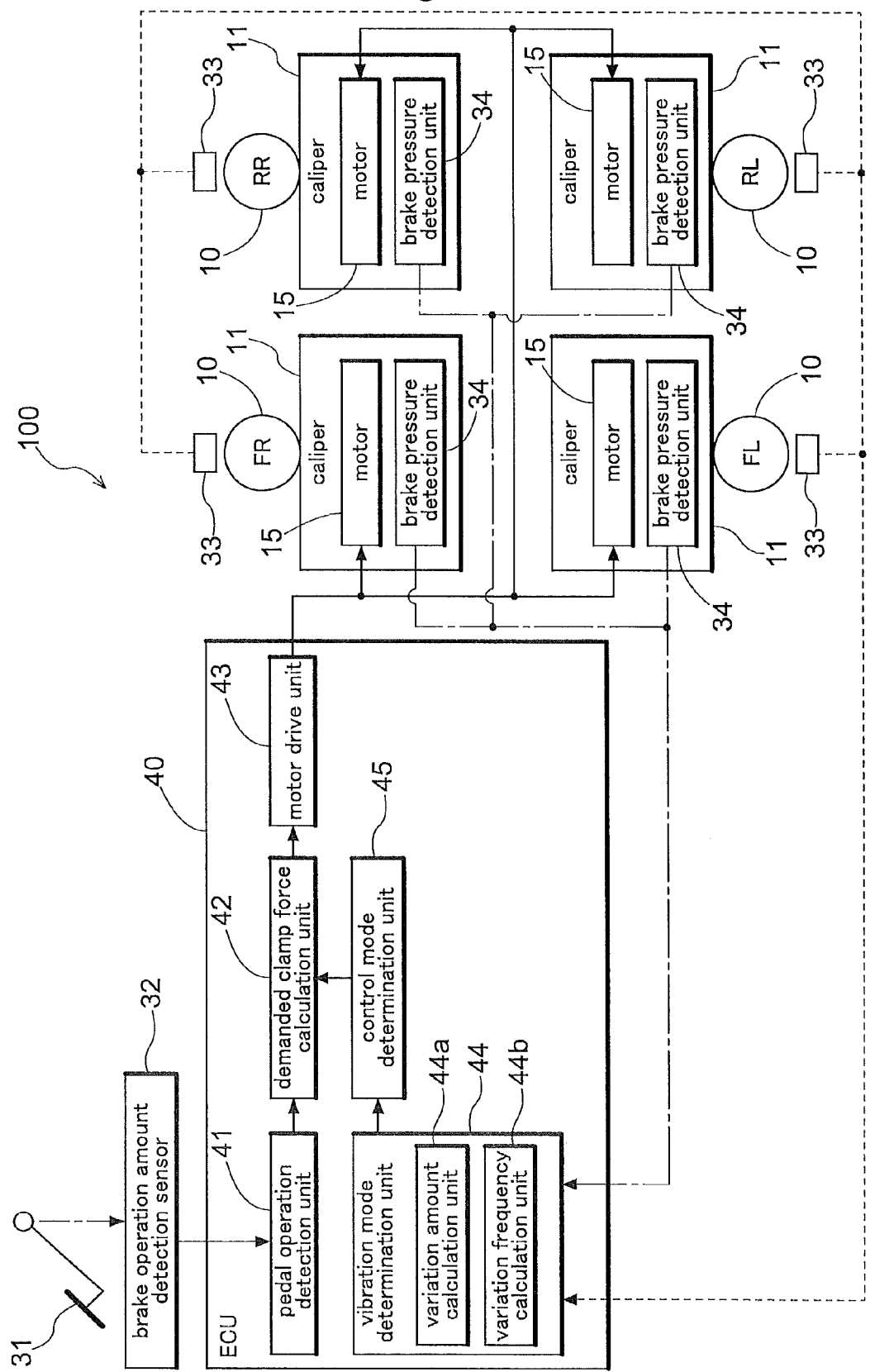

Next, the construction of the vehicle brake apparatus 100 relating to the present invention will be described. FIG. 3 is a block diagram schematically showing the vehicle brake apparatus 100. This vehicle brake apparatus 100 is comprised of a so-called "brake-by-wire", which includes, in addition to the disc rotor 10, the caliper 11, the drive mechanism 14, the motor 15 described above, a brake pedal 31, a brake operation amount detection sensor 32, the wheel speed sensor 33, a brake pressure detection unit 34 and an ECU 40. And, the ECU 40 is constituted of a pedal operation detection unit 41, a demanded clamp force calculation unit 42, a motor drive unit 43, a vibration mode determination unit 44, a control mode determination unit 45. Further, the vibration mode determination unit 44 includes a variation amount calculation unit 44a and a variation frequency calculation unit 44b.

Meanwhile, the disc rotor 10, as shown in FIG. 3, is provided for each one of a right front FR, a left front FL, a right rear RR and a left rear RL. Similarly, the caliper 11 and the motor 15 are also provided for each one of wheels. The caliper 11 is illustrated to include the motor 15 and the brake pressure detection unit 34, but illustration of above-described components such as the brake pads 13 is omitted.

The brake operation amount detection sensor 32 corresponds to "a brake operation amount detecting means" for determining an operation amount given by the driver to the brake pedal 31. The wheel speed sensor 33 corresponds to "a rotation speed detecting means" for detecting a rotation speed of the disc rotor 10. The wheel speed sensor 33 can be configured to detect rotation of the disc rotor 10 and output the result of this detection in the form of so-called vehicle speed pulses or the like. The wheel speed sensor 33 having such function as above is provided for each one of the wheels of the right front FR, the left front FL, the right rear RR, the left rear RL. The results of detections obtained by these sensors, i.e. the brake operation amount sensor 32, the wheel speed sensor 33, are transmitted as the respective sensor outputs to the pedal operation detection unit 41 and the vibration mode determination unit 44 of the ECU 40.

The pedal operation detection unit 41 detects an operation (stepping-on) of the brake pedal 31 by a driver. This detection is effected, based on the detection result from the brake operation amount detection sensor 32. If the pedal operation detection unit 41 detects an operation of the brake pedal 31 by the driver, this event of the operation of the brake pedal 31 is communicated to the demanded clamp force calculation unit 42, and the operation amount of the brake pedal 31 communicated from the brake operation amount detection sensor 32 is communicated.

The demanded clamp force calculation unit 42 calculates a pressing force for pressing the brake pad 13 against the disc rotor 10, in accordance with an operation amount of the brake pedal 31. This pressing force corresponds to a braking amount demanded by the operation of the brake pedal 31 (demanded clamp force). The calculation result of the demanded clamp force calculated by the demanded clamp force calculation unit 42 is communicated as a pressing force corresponding to the operation amount of the brake pedal 31 to the motor drive unit 43 to be described later.

The motor drive unit 43 corresponds to "a motor controlling means" for controlling the motor 15 in such a manner that the brake pads 13 are pressed against the disc rotor 10 in accordance with a brake operation. As described above, the motor drive unit 43 receives, from the demanded clamp force calculation unit 42, a pressing force which was calculated in correspondence with an operation amount of the brake pedal 31. And, the motor drive unit 43 drives the motor 15 such that this pressing force can be applied to the brake pads 13. More particularly, the motor drive unit 43 supplies an electric power to the stator coil of the stator 21 of the motor 15 in such a manner that the motor 15 may output a rotation force (a torque) corresponding to this pressing force. With this, the brake pads 13 are pressed against the disc rotor 10, thereby to apply a brake force to the wheel.

The brake pressure detection unit 34 corresponds to "a brake pressure detecting means" for detecting at least either one of a pressing force for pressing the brake pads 13 against the disc rotor 10 and the load applied to the brake pads 13 when these brake pads 13 are pressed against the disc rotor 10. As described above, in accordance with an operation amount of the brake pedal 31 by the driver, the brake pads 13 are pressed against the disc rotor 10. The brake force detection unit 34 detects at least one of the pressing force for pressing the brake pads 13 during this operation and the load acting on the brake pads 13 during this operation. Preferably, such brake pressure detection unit 34 is constituted of a load cell, a load sensor, etc. The result of detection by the brake pressure detection unit 34 is communicated to the vibration mode determination unit 44 included in the ECU 40.

The vibration mode determination unit 44, as described hereinbefore, includes the variation amount calculation unit 44a and the variation frequency calculation unit 44b. The variation amount calculation unit 44a calculates a variation amount of detection values detected by the brake pressure detection unit 34 during one rotation of the disc rotor 10. Here, the language "variation amount" refers to an amount of variation relative to a predetermined reference value (variation reference). The "predetermined reference value" represents the pressing pressure per se calculated in accordance with a brake operation by the driver. Therefore, the variation amount corresponds to an amount which varies relative to the calculated pressing force. Also, in case the detection values detected by the brake pressure detection unit 34 fluctuates as indicated by (A) in FIG. 4, the variation amount can be the peak-to-peak value in one cycle. This peak-to-peak value corresponds to the value denoted with a mark (pp) in FIG. 4. Incidentally, in the case of the detection values illustrated in FIG. 4, one cycle of variation amount corresponds to one rotation of the disc rotor 10.

Figure 4:
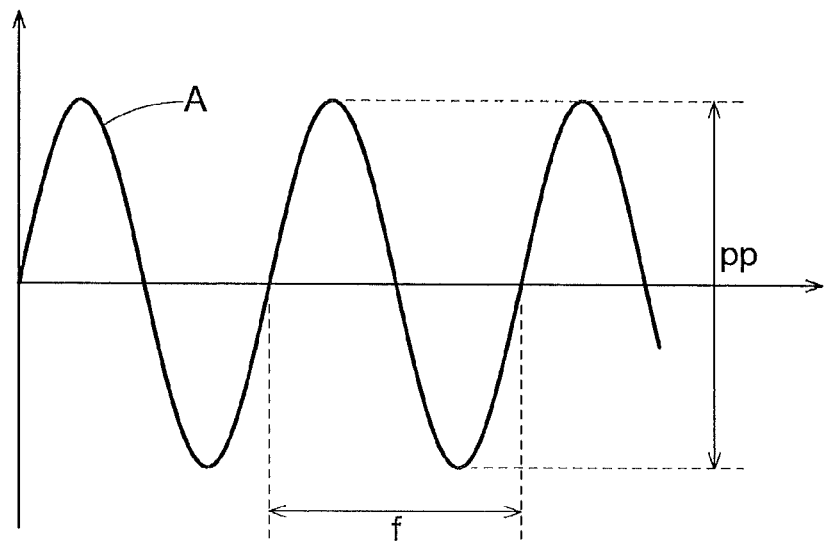

And, the variation frequency calculation unit 44b calculates a detection value variation frequency relating to variation of the detection values detected by the brake pressure detection unit 34. For instance, in case the detection values detected by the brake pressure detection unit 34 fluctuate as indicated by (A) in FIG. 4, the detection value variation frequency corresponds to the frequency for each cycle. In FIG. 4, this is denoted with a mark (f). The variation frequency calculation unit 44b calculates such frequency for each cycle.

The vibration mode determination unit 44 determines whether the variation amount of the detection values detected by the brake pressure detection unit 34 during one rotation of the disc rotor 10 is greater than a preset, variation amount determination threshold value or not. The variation amount of the detection values detected by the brake pressure detection unit 34 during one rotation of the disc rotor 10 is calculated by the above-described variation amount calculation unit 44a. The variation amount determination threshold value is stored in advance in the vibration mode determination unit 44. If the variation amount of the detection values detected by the brake pressure detection unit 34 during one rotation of the disc rotor 10 is large, the vibration applied to the vehicle in accordance with this variation amount is large, too. Whereas, if the variation amount of the detection values is small, the vibration applied to the vehicle in accordance with this variation amount is small, too. Therefore, in case the variation amount of the detection values is large, a crew of the vehicle will likely feel a vibration due to the change in the brake pressure. Whereas, in case the variation amount of the detection values is small, a crew of the vehicle will unlikely feel a vibration due to the change in the brake pressure. For this reason, determining the magnitude of variation amount of the detection values is suitable for estimating the magnitude of vibration given to the vehicle. The result of this determination will be transmitted to the control mode determination unit 45 which will be described later.

And, the vibration mode determination unit 44 determines whether or not a detection value variation frequency has a correlation to a rotation speed detected by the rotation speed detecting means. The detection value variation frequency is calculated by the variation frequency calculation unit 44b described above and the rotation speed is transmitted from the wheel speed sensor 33. Here, presence of a correlation between the detection value variation frequency and the rotation speed corresponds to presence of a predetermined relationship (proportional relationship) between the change amount or change ratio of the rotation speed and the change amount or change ratio of the detection value variation frequency.

For instance, if a portion of irregular thickness in the rotor disc 10 ("irregular thickness portion") exists at one part along the peripheral direction of this rotor disc 10, the change amount or change ratio of the variation frequency of the brake pressure detected by the brake pressure detection unit 34 corresponds in one-to-one relationship to the change amount or change ratio of the rotation speed of the disc rotor 10. Further, for example, if a portion of irregular thickness in the rotor disc 10 exists at two or more parts along the peripheral direction of this rotor disc 10, the change amount or change ratio of the variation frequency of the brake pressure due to either one irregular thickness part corresponds in one-to-one relationship to the change amount or change ratio of the rotation speed of the disc rotor 10.

Therefore, by determining whether or not a change amount or change ratio of the detection value variation frequency has a correlation to a change amount or change ratio of the rotation speed, it is readily possible to identify whether the variation of the detection values detected by the brake pressure detection unit 34 is due to thickness irregularity of the disc rotor 10 or not. In this way, the vibration mode determination unit 44 determines whether or not a detection value variation frequency has a correlation to a variation of rotation speed and then communicates the result of this determination to the control mode determination unit 45.

Further, the vibration mode determination unit 44 determines whether or not the detection value variation frequency is greater than a preset variation frequency determination threshold value or not. The variation frequency determination threshold value is stored in advance in the vibration mode determination unit 44. If the variation frequency of the detection values detected by the brake pressure detection unit 34 is high, the vibration due to the variation of the detection values will be less likely felt by the vehicle crew due to e.g. road noise received from the road surface during traveling. On the other hand, in case the variation frequency of the detection values is low too, the vibration relating to the variation of the detection values will be less likely felt by the vehicle crew. For this reason, determining variation frequency of detection values is suitable for estimating whether the vehicle crew will likely feel the vibration or not. The result of this determination is communicated by the control mode determination unit 45 which will be described later.

Figure 5A:
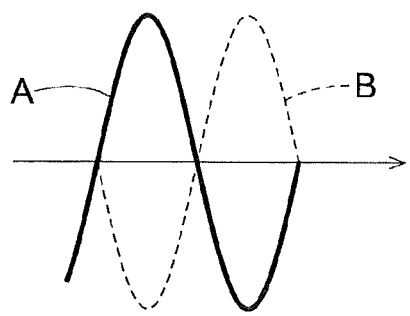
Figure 5B:
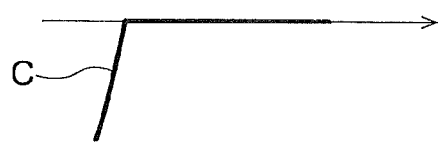

The control mode determination unit 45 determines a control mode for vibration restriction control for preventing abnormal vibration due to thickness irregularity of the disc rotor 10, based on the determination result of the vibration mode determination unit 44. The control modes of the vibration restriction control relating to the instant embodiment include not only an inverted phase control mode, but also an in-phase control mode. Here, the "inverted phase mode" refers to a control mode configured to be effected in such a manner as to cancel out the variation amount of detection values detected by the brake pressure detection unit 34 during one rotation of the disc rotor 10. For instance, in the case of the detection value detected by the brake pressure detection unit 34 being one denoted with A in FIG. 5A, if the detection value A fluctuates in the positive direction relative to the variation reference (e.g. amplitude variation of the detection values) as indicated by a broken line B in FIG. 5A, the control will be executed with the same amplitude and in the negative direction. If the detection value A fluctuates in the negative direction, the control will be executed with the same amplitude and in the positive direction relative thereto. With execution of such controls, it is possible to render the amplitude of the detection result by the brake pressure detection unit 34 constant as indicated by C in FIG. 5B. That is, as the brake pressure change is rendered constant with execution of such controls as above, it is possible to prevent the vehicle crew from feeling any abnormal vibration due to detection value variation.

Figure 6A:
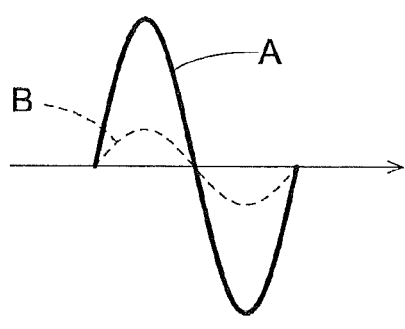
Figure 6B:
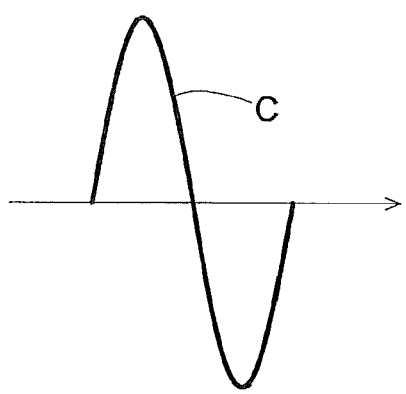

On the other hand, the "in-phase control" above refers to a control to be executed for increasing the variation amount of the detection values detected by the brake pressure detection unit 34. For instance, if the detection values detected by the brake pressure detection unit 34 is A as shown in FIG. 6A, in case the detection value A fluctuates in the positive direction, the control will be executed at least in the positive direction relative to the variation reference of the detection values A (e.g. the amplitude reference of the detection values) as indicated by the broken line B in FIG. 6A, whereas, the control will be executed at least in the negative direction in case the detection values A fluctuates in the negative direction. With execution of such controls, it is possible to positively increase the amplitude of the detection result by the brake pressure detection unit 34 as indicated by C in FIG. 6B.

By increasing the amplitude of the detection values as above, it is possible to positively press the brake pads 13 against a greater thickness portion of the disc rotor 10 strongly, thereby to "trim" this greater thickness portion. Therefore, it is possible to restrict thickness irregularity in the disc rotor 10. Incidentally, in case this control for increasing the amplitude is to be effected, this will be effected in such a situation where the vehicle crew will hardly feel any vibration of the vehicle due to variation in the detection values originally (e.g. in the case of the variation amount of the detection values being small, the case of detection value variation frequency of the detection values being high or the detection value variation frequency of the detection values being low, etc.).

The control mode determination unit 45 determines the control mode for the vibration restriction control to the inverted phase control mode, provided the variation amount of the detection values detected by the brake pressure detection unit 34 during one rotation of the disc rotor is greater than the preset variation amount determination threshold value and the detection value frequency relating to the variation of this detection values has the correlation to the rotation speed detected by the wheel speed sensor 33 and the detection value variation frequency is greater than the preset variation frequency determination threshold value.

Further, the control mode determination unit 45 determines the control mode for the vibration restriction control to the in-phase control mode, provided the variation amount of the detection values detected by the brake pressure detection unit 34 during one rotation of the disc rotor 10 is greater than the preset variation amount determination threshold value and the detection value variation frequency relating to the variation of this detection values has the correlation to the rotation speed detected by the wheel speed sensor 33 and the detection value variation frequency is smaller than the preset variation frequency determination threshold value.

Moreover, in case the above-described variation amount determination threshold value is set as a "first variation frequency determination threshold value", the control mode determination unit 45 will determine the control mode for the vibration restriction control mode to the in-phase control mode, provided the variation amount of the detection values detected by the brake pressure detection unit 34 during one rotation of the disc rotor 10 is greater than the preset variation amount determination threshold value and the detection value variation frequency relating to the variation of this detection values has the correlation to the rotation speed detected by the wheel speed sensor 33 and the detection value variation frequency is greater than a second variation frequency determination threshold value which is preset to be greater than the first frequency determination threshold value. The control mode determined by the control mode determination unit 45 will be communicated to the demanded clamp force calculation unit 42.

Upon communication (input) of the control mode determined by the control mode determination unit 45, the demanded clamp force calculation unit 42 calculates a pressing force, based upon this control mode determined by the control mode determination unit 45. The result of this calculation is communicated to the motor drive unit 43.

Then, the motor drive unit 43 controls the motor 15, according to the pressing force calculated by the demanded clamp force calculation unit 42. More particularly, if the control mode in the inverted phase control is determined by the control mode determination unit 45, the motor drive unit 43 will control the motor 15 in the inverted phase to the variation of the detection values.

Further, if the control mode in the in-phase control is determined by the control mode determination unit 45, the motor drive unit 43 will control the motor 15 in the in-phase to the variation in the detection values, in an entirety or a part of a range where the detection value variation frequency is smaller than the variation frequency determination threshold value (the first variation frequency determination threshold value). Here, the language "an entirety of a range where the detection value variation frequency is smaller than the variation frequency determination threshold value (the first variation frequency determination threshold value" refers to the range where the detection value variation frequency becomes smaller than the variation frequency determination threshold value (the first variation frequency determination threshold value) and then becomes zero (that is, until the rotation speed becomes zero). The language "a part of a range where the detection value variation frequency is smaller than the variation frequency determination threshold value (the first variation frequency determination threshold value" refers to a part of the range where the detection value variation frequency becomes smaller than the variation frequency determination threshold value (the first variation frequency determination threshold value) and then becomes zero (that is, until the rotation speed becomes zero). Namely, in such case, it will become possible for the motor drive unit 43 to initiate the in-phase control after lapse of a predetermined period after the detection value variation frequency having become smaller than the variation frequency determination threshold value (first variation frequency determination threshold value) or to stop the in-phase control before the detection value variation frequency becomes zero.

Similarly, in case the control mode determination unit 45 determines a control in in-same phase when the detection value variation frequency exceeds the second variation frequency determination threshold value, the motor drive unit 43 will control the motor 15 in the in-phase to the variation in the detection values, in an entirety or a part of a range where the detection value variation frequency exceeds the second variation frequency determination threshold value. Here, the language "an entirety of a range where the detection value variation frequency exceeds the second variation frequency determination threshold value" refers to entire range where the detection value variation frequency is greater than the second variation frequency determination threshold value. The language "a part of a range where the detection value variation frequency exceeds the second variation frequency determination threshold value" refers to a part of the range where the detection value variation frequency is greater than the second variation frequency determination threshold value. That is, in such case as above, in a situation where the detected value variation frequency is greater than the second variation frequency determination threshold value, the motor drive unit 43 can effect the control, with inclusion of a range where the in-phase control is not executed.

Figure 7A:
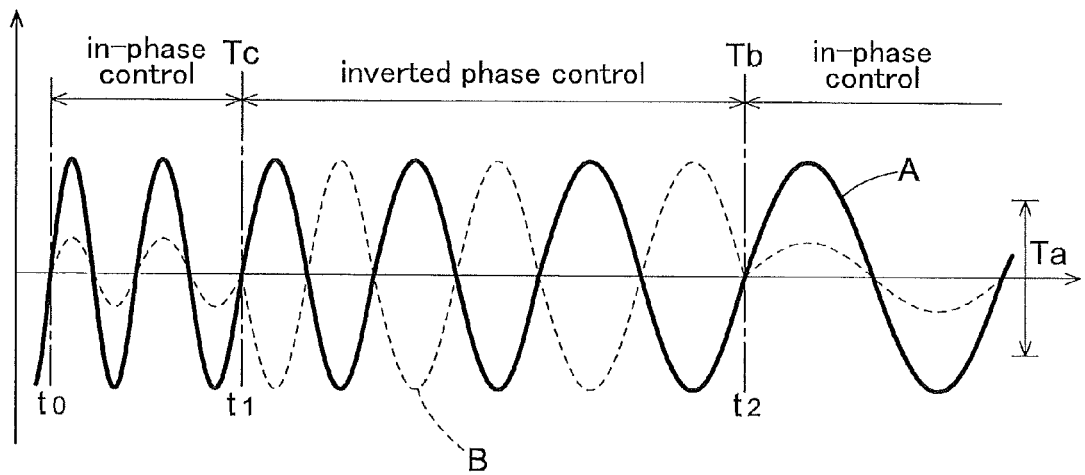

Next, the controls by the inventive vehicle brake apparatus 100 will be explained, with using some actually obtained detection values. FIG. 7A shows actually obtained detection values denoted with the mark (A). Such detection values A as above will be transmitted to the vibration mode determination unit 44 in realtime, so that a control mode will be determined in realtime by the control mode determination unit 45. Therefore, if the control is to be executed with detection of one cycle mount of waveform A, there is the possibility of a lag occurring in the execution of the control at the forward half of one cycle. For this reason, preferably, the inventive brake control apparatus 100 determines a current control mode with using detection result obtained at a predetermined period ago.

FIG. 7A shows that during the period from a timing t0 to a timing t1, the variation amount (pp) of the detection values A is greater than the preset variation amount determination threshold value Ta. Further, it is assumed that from this timing t0 to t1, there exists a correlation between the detection value variation frequency and the rotation speed. Here, provided the variation frequency determination threshold value being the first variation frequency determination threshold value Tb, as the detection value variation frequency of the detection values A is greater than the second variation frequency determination threshold value Tc which is preset to be greater than the first variation frequency determination threshold value Tb, the control mode determination unit 45 determines the control mode to the in-phase control mode. The broken line B indicates the press force relating to the in-phase control calculated by the demanded clamp force calculation unit 42. With this, the motor drive unit 43 will control the motor 15 in the in-phase such that the amplitude of the detection values may be increased from the timing t0 to t1 as indicated by the mark C in FIG. 7B.

Figure 7B:
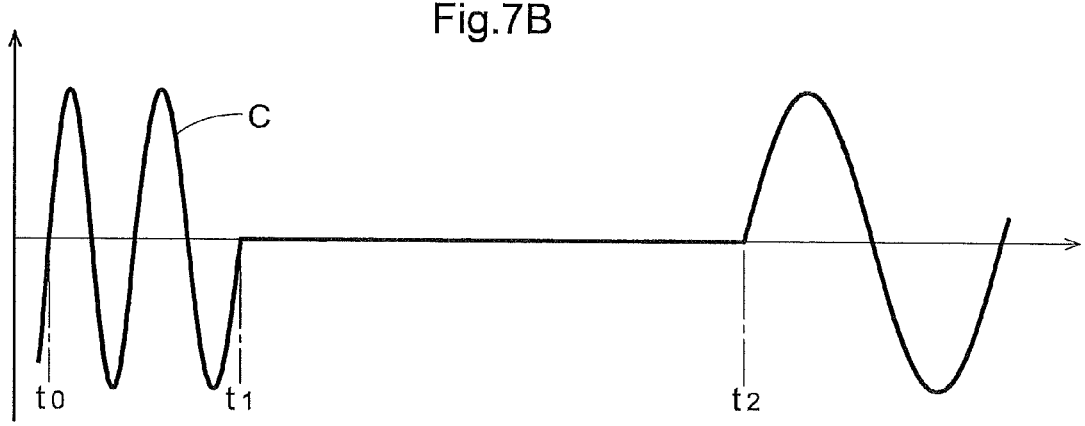

Further, referring back to FIG. 7A, it is assumed that from the timing t1 to the timing t2, the variation amount (pp) of the detection values A is greater than the preset, variation amount determination threshold value Ta and the detection value variation frequency has a correlation to the rotation speed. In this case, as the detection value variation frequency of the detection values A is greater than the preset first variation frequency determination threshold value Tb and not greater than the second variation frequency determination threshold value Tc, the control mode determination unit 45 will determine the control mode as the inverted phase control mode. With this, the motor drive unit 43 will control the motor 15 in the inverted phase such that the amplitude of the detection values may be rendered to substantially zero from the timing t1 to the timing t2, as shown in FIG. 7B.

Further, it is assumed that after the timing t2, the variation amount (pp) of the detection values A is greater than the preset variation amount determination threshold value Ta and the detection value variation frequency has a correlation to the rotation speed. In this case, as the detection value variation frequency of the detection values A is smaller than the present first variation frequency determination threshold value Tb, the control mode determination unit 45 will determine the control as the in-phase control mode. With this, the motor drive unit 43 will control the motor 15 in the in-phase such that after the timing t2, the amplitude of the detection values may be increased, as shown in FIG. 7B.

With execution of the controls described above, when the detection value variation frequency is a frequency range where the vehicle crew will likely feel the vibration, the control will be executed so as to cancel out the fluctuation of the detection values. As a result, the vehicle crew will not feel abnormal vibration due to thickness irregularity of the disc rotor 10. On the other hand, when the detection value variation frequency is a frequency range where the vehicle crew will unlikely feel the vibration, the control will be executed to increase the amplitude of the detection values, so that a greater thickness portion of the disc rotor 10 may be "trimmed" positively, thereby to restrict the thickness irregularity of the disc rotor 10. Incidentally, in such control as above, preferably, the above-described first variation frequency determination threshold value Tb may be set to e.g. 1 Hz and the second variation frequency determination threshold value Tc may be set to e.g. 2 Hz. Needless to say, the first variation frequency determination threshold value Tb and the second variation frequency determination threshold value Tc can be set to any other frequencies than the above. Also, in case there occurs a change in the detection value variation frequency of the detection values detected by the brake pressure detection unit 34 in the course until its arrival at the crew's position due to its transmission via the respective portions of the vehicle (e.g. the seat, body, a shock absorber, etc.), it is possible to set the variation amount determination threshold value Ta, the first variation frequency determination threshold value Tb and the second variation frequency determination threshold value Tc, in consideration to these respective portions of the vehicle.

Further, in FIG. 7, the regions where the in-phase control is executed have been explained as the entirety of the range where the detection value variation frequency is smaller than the first variation frequency determination threshold value and the entirety of the range where the detection value variation frequency exceeds the second variation frequency determination threshold value. Needless to say, the above range can be a part of the range where the detection value variation frequency is smaller than the first variation frequency determination threshold value and a part of the range where the detection value variation frequency exceeds the second variation frequency determination threshold value. Or, either one of the above can be a partial range, as a matter of course.

In the above, preferably, the motor drive unit 43 can be configured to inhibit the vibration restriction control if a sudden braking operation is effected. Here, the language "a sudden braking operation" refers to an operation for stopping the vehicle for its emergency stop, for instance. With this arrangement, in case a sudden braking operation is effected, the vehicle brake apparatus 100 can allow the operation for stopping the vehicle to take place with priority.

Further, preferably, the motor drive unit 43 may be configured not to execute the vibration restriction control in case a vehicle behavior braking control (e.g. an ABS control, an anti-skid control, a traction control, a pre-crush control, etc.) is effected. Of the vehicle behavior braking control, the anti-skid control and the traction control are controls that are executed for rendering the behavior of the vehicle normal, when the behavior of the vehicle has become unstable. The pre-crush control is a control that is executed to ensure a braking force in the event of crush of the vehicle, thereby to reduce damage resulting therefrom. As the motor drive unit 43 allows the operation by the vehicle behavior braking control to take place with priority, by inhibiting the vibration restriction control, the vehicle brake apparatus 100 can ensure vehicle safety with priority.

Further, preferably, the motor drive unit 43 can be configured to inhibit the vibration restriction control, provided the variation amount of the detection values is greater than the variation amount determination threshold value due to an operation of the brake pedal 31 by the driver's stepping operation with cyclically increasing and decreasing the stepping force and the detection value variation frequency has a correlation with the rotation speed and the detection value variation frequency and the predetermined threshold value has a predetermined relationship. Here, the above language "an operation of the brake pedal 31 by the driver's stepping operation with cyclically changing stepping force" refers to e.g. such braking operations in which the driver effects an additional stepping-on or stepping-off of the brake pedal 31, a pumping braking operation, etc. Further, the case when the variation amount of the detection values is greater than the variation amount determination threshold and the detection value variation frequency has a correlation with the rotation speed and the detection value variation frequency and the preset determination threshold value have a predetermined relationship with each other refers to a case of establishment of the conditions for executing the inverted phase control of the in-phase control. That is, it refers to the case of the frequency involved in the driver's braking operation of additional stepping-on or stepping-off is included in the variation frequency band (the frequency band of the detection value variation frequency). Further, the control for the variation of the detection values refers to control in the inverted phase or the in-phase described above. Therefore, in case a braking operation involving additional stepping-on or stepping-off by the driver with a frequency included in the variation frequency band, the motor drive unit 43 will not execute the control in the inverted phase or in-phase, even with establishment of the conditions for execution of the inverted phase control or in-phase control. As a result, there is executed no control with a braking force at a frequency different from the driver's intension. For this reason, the vehicle brake apparatus 100 can maintain the braking force relating to a braking operation intended by the driver (a braking operation involving an additional stepping-on or stepping-off, or a pumping braking operation, etc.)

Next, the control effected by the inventive vehicle brake apparatus 100 will be explained with reference to the flowchart shown in FIG. 8. The vehicle brake apparatus 100 effects determination whether a sudden braking operation is being effected for the vehicle brake apparatus 100 or not, or whether a vehicle behavior braking operation is being effected therefor or not or whether the frequency of the operation of the brake pedal 31 by the driver with cyclic increase/decrease in the stepping force is included in the variation frequency range or not. If it is determined that a sudden braking operation or a vehicle behavior braking operation is being effected for the vehicle brake apparatus 100 or the operation of the brake pedal 31 by the driver with cyclic increase/decrease in the stepping force is included in the variation frequency range (step #01: No), the process is continued. On the other hand, if it is determined that a sudden braking operation or a vehicle behavior braking operation is not being effected for the vehicle control apparatus 100 or the operation of the brake pedal 31 by the driver with cyclic increase/decrease in the stepping force is not included in the variation frequency range (step #01: Yes), the process goes on to effect determination whether the detection value detected by the brake pressure detection unit 34 is greater than the variation amount determination threshold value or not.

If it is determined that the detection value detected by the brake pressure detection unit 34 is greater than the preset variation amount determination threshold value (step #02: Yes), the process goes on to effect determination whether the detection value variation frequency has a correlation with the rotation speed or not. If it is determined that the variation amount of the detection values detected by the brake pressure detection unit 34 during one rotation of the disc rotor 10 is not greater than the preset variation amount determination threshold value (step #02: No), the process returns to step #01 to continue the above process.

If it is determined that the detection value variation frequency has a correlation with the rotation speed (step #03: Yes), the process effects determination whether the detection value variation frequency is included in the preset frequency range or not. If it is determined that the detection value variation frequency has no correlation with the rotation speed (step #03: No), the process returns to step #01 to continue the above process.

If it is determined that the detection value variation frequency is included in the preset frequency range (step #04: Yes), the control mode determination unit 45 determines the control mode as the inverted phase control mode. With this, the motor drive unit 43 controls the motor 15 under the inverted phase mode (step #05). On the other hand, if it is determined that the detection value variation frequency is not included in the preset frequency range (step #04: No), the control mode determination unit 45 determines the control mode as the in-phase control mode. With this, the motor drive unit 43 controls the motor 15 under the in-phase control mode (step #06).

With execution of controls according to the above flow, it is possible to reduce abnormal vibration due to thickness irregularity in the disc rotor 10, so that it is possible to prevent the vehicle crew from feeling abnormal vibration. Incidentally, the step #01 shown in the flowchart of FIG. 8 may be effected either after steps #02, #03 or before steps #05, #06.

[Other Embodiments]

In the foregoing embodiment, the motor drive unit 43 was explained as being configured such that the unit 43 controls the motor 15 in in-phase relative to variation of the detection values, in an entirety or a part of the range where the detection value variation frequency is smaller than the preset variation frequency determination threshold value, provided the variation amount of the detection value determined by the brake pressure detecting means 34 during one rotation of the disc rotor 10 is greater than the preset variation amount determination threshold value and the detection value variation frequency relating to the variation of the detection values has a correlation with the rotation speed detected by the wheel speed sensor 33. However, the present invention is not limited thereto. For instance, the control by the motor drive unit 43 may be only stopping the inverted phase control in the entire range where the detection value variation frequency is smaller than the variation frequency determination threshold value, provided the variation amount of the detection value determined by the brake pressure detecting means 34 during one rotation of the disc rotor 10 is greater than the preset variation amount determination threshold value and the detection variation frequency relating to the variation of the detection values has a correlation to the rotation speed detected by the wheel speed sensor 33. With execution of such control, in the case of vibration of such a degree as not being felt by the vehicle crew, neither the inverted phase control nor the in-phase control is executed, whereby the power consumption and the wear of the motor 15 can be reduced.

In the foregoing embodiment, the motor drive unit 43 was explained as being configured such that the unit 43 controls the motor 15 in in-phase relative to variation of the detection values, in an entirety or a part of the range where the detection value variation frequency is greater than the variation frequency determination threshold value, provided the variation amount of the detection values determined by the brake pressure detecting means 34 during one rotation of the disc rotor 10 is greater than the preset variation amount determination threshold value and the detection value variation frequency relating to the variation of the detection values has a correlation with the rotation speed detected by the wheel speed sensor 33. However, the present invention is not limited thereto. For instance, the control by the motor drive unit 43 may be execution of the vibration restriction control only when the detection value variation frequency is smaller than the second variation frequency determination threshold value which is preset to be greater than the first variation frequency determination threshold value, as a matter of course. With this configuration, in the case of vibration of such a degree as not being felt by the vehicle crew, neither the inverted phase control nor the in-phase control is executed, whereby the power consumption and the wear of the motor 15 can be reduced.

In the foregoing embodiment, it was explained that the inverted phase control or the in-phase control is executed with requiring as one condition thereof, the variation amount of the detection values detected by the brake pressure detection unit 34 being greater than the preset variation amount determination threshold value. However, the present invention is not limited thereto. For instance, it is possible to configure such that the in-phase control is executed in entirety or part of the range, provided the variation amount of the detection values detected by the brake pressure detection unit 34 is below the preset variation amount determination threshold value. With this configuration, it becomes possible to appropriately restrict thickness irregularity of the disc rotor 10.

In the foregoing embodiment, the caliper 11 was described as comprising a floating type caliper. However, the range of application of the present invention is not limited thereto. For instance, the present invention may be applied to the opposed type caliper.

Industrial Applicability

The present invention may be applied to a vehicle brake apparatus comprising: a disc rotor mounted to be rotatable in unison with a wheel provided in a vehicle; a caliper fixed to a fixing member of the vehicle and including a brake pad movable along a rotor axis direction of the disc rotor; a drive mechanism for moving the brake pad by a drive force of a motor along the rotor axis direction to press the brake pad against the disc rotor in response to a braking operation; a motor controlling means for controlling the motor for pressing the brake pad against the disc rotor; a brake pressure detecting means for detecting at least one of a pressing force for pressing the brake pad against the disc rotor or a load applied to the brake pad when the brake pad is pressed against the disc rotor; and a rotation speed detecting means for detecting a rotation speed of the disc rotor.

DESCRIPTION OF REFERENCE MARKS

10: disc rotor
11: caliper
15: motor
31: brake pedal
32: brake operation amount detection sensor
33: wheel speed sensor
34: brake pressure detection unit
40: ECU
41: pedal operation detection unit
42: demanded clamp force calculation unit
43: motor drive unit
44: vibration mode determination unit
44a: variation amount calculation unit
44b: variation frequency calculation unit
45: control mode determination unit
100: vehicle brake apparatus

The invention claimed is:
1. A vehicle brake apparatus comprising:
a disc rotor mounted to be rotatable in unison with a wheel provided in a vehicle;
a caliper fixed to a fixing member of the vehicle and including a brake pad movable along a rotor axis direction of the disc rotor;
a drive mechanism for moving the brake pad by a drive force of a motor along the rotor axis direction to press the brake pad against the disc rotor;
a motor controlling means for controlling the motor for pressing the brake pad against the disc rotor;
a brake pressure detecting means for detecting at least one of a pressing force for pressing the brake pad against the disc rotor or a load applied to the brake pad when the brake pad is pressed against the disc rotor; and
a rotation speed detecting means for detecting a rotation speed of the disc rotor;
wherein if a variation amount in detection values detected by said brake pressure detecting means during one rotation of the disc rotor exceeds a variation amount determination threshold value and a detection value variation frequency relating to the variation in the detection values has a correlation with the rotation speed detected by said rotation speed detecting means and the detection value variation frequency exceeds a preset variation frequency determination threshold value, said motor controlling means effects a vibration restricting control for controlling the motor in inverted phase to the variation in the detection values, and
wherein said variation frequency determination threshold value is provided as a first variation frequency determination threshold value; and said motor controlling means is configured to execute said vibration restricting control only if said detection value variation frequency is lower than a second variation frequency determination threshold value which is preset to be greater than said first variation frequency determination threshold value.

2. The brake control apparatus according to claim 1, wherein said vibration restricting control executed by said motor controlling means includes control for controlling the motor in in-phase to a detection value variation in an entirety or a part of a range where said detection value variation frequency is smaller than said first variation frequency determination threshold value, provided said variation amount in detected values is greater than said variation amount determination threshold value and said detection value variation frequency has a correlation with said rotational speed.

3. The brake control apparatus according to claim 1, wherein said vibration restricting control executed by said motor controlling means includes control for controlling the motor in in-phase to a detection value variation in an entirety or a part of a range where said detection value variation frequency exceeds said second variation frequency determination threshold value, provided said variation amount in detected values is greater than said variation amount determination threshold value and said detection value variation frequency has a correlation with said rotational speed.

4. The brake control apparatus according to claim 1, wherein said motor controlling means is configured to inhibit said vibration restricting control in case any one of a sudden braking, a vehicle behavior braking control, or a brake pedal operation by a driver with cyclic increase/decrease in the stepping force is effected.

5. A vehicle brake apparatus comprising:
a disc rotor mounted to be rotatable in unison with a wheel provided in a vehicle;
a caliper fixed to a fixing member of the vehicle and including a brake pad movable along a rotor axis direction of the disc rotor;
a drive mechanism for moving the brake pad by a drive force of a motor along the rotor axis direction to press the brake pad against the disc rotor;
a motor controlling means for controlling the motor for pressing the brake pad against the disc rotor;
a brake pressure detecting means for detecting at least one of a pressing force for pressing the bake pad against the disc rotor or a load applied to the a brake pad when the brake pad is pressed against the disc rotor; and
a rotation speed detecting means for detecting speed of the disc rotor;
wherein if a variation amount in detection values detected by said brake pressure detecting means during one rotation of the disc rotor exceeds a variation amount determination threshold value and a detection value variation frequency relating to the variation in the detection values has a correlation with the rotation speed detected by said rotation speed detecting means and the detection value variation frequency exceeds a preset variation frequency determination threshold value, said motor controlling means effects a vibration restricting control for controlling the motor in inverted phase to the variation in the detection values, and
wherein said vibration restricting control executed by said motor controlling means includes control for controlling the motor in in-phase to a detection value variation in an entirety or a part of a range where said detection value variation frequency is smaller than said variation frequency determination threshold value, provided said variation amount in detected values is greater than said variation amount determination threshold value and said detection value variation frequency has a correlation with said rotational speed.

6. The brake control apparatus according to claim 5, wherein said motor controlling means is configured to inhibit said vibration restricting control in case any one of a sudden braking, a vehicle behavior braking control, or a brake pedal operation by a driver with cyclic increase/decrease in the stepping force is effected.

7. A vehicle brake apparatus comprising:
a disc rotor mounted to be rotatable in unison with a wheel provided in a vehicle;
a caliper fixed to a fixing member of the vehicle and including a brake pad movable along a rotor axis direction of the disc rotor;
a drive mechanism for moving the brake pad by a drive force of a motor along the rotor axis direction to press the brake pad against the disc rotor;
a motor controlling means for controlling the motor for pressing the brake pad against the disc rotor;
a brake pressure detecting means for detecting at least one of a pressing force for pressing the brake pad against the disc rotor or a load applied to the brake pad when the brake pad is pressed against the disc rotor; and
a rotation speed detecting means for detecting a rotation speed of the disc rotor;
wherein if a variation amount in detection values detected by said brake pressure detecting means during one rotation of the disc rotor exceeds a variation amount determination threshold value and a detection value variation frequency relating to the variation in the detection values has a correlation with the rotation speed detected by said rotation speed detecting means and the detection value variation frequency exceeds a preset variation frequency determination threshold value, said motor controlling means effects a vibration restricting control for controlling the motor in inverted phase to the variation in the detection values, and
wherein said variation frequency determination threshold value is provided as a first variation frequency determination threshold value; and said vibration restricting control executed by said motor controlling means includes control for controlling the motor in in-phase to a detection value variation in an entirety or a part of a range where said detection value variation frequency exceeds a second variation frequency determination threshold value which is preset to be greater than said first variation frequency determination threshold value, provided said variation amount in detected values is greater than said variation amount determination threshold value and said detection value variation frequency has a correlation with said rotational speed.

8. The brake control apparatus according to claim 7, wherein said motor controlling means is configured to inhibit said vibration restricting control in case any one of a sudden braking, a vehicle behavior braking control, or a brake pedal operation by a driver with cyclic increase/decrease in the stepping force is effected.

* * * * *

UNITED STATES PATENT AND TRADEMARK OFFICE
CERTIFICATE OF CORRECTION

| | | |
|---|---|---|
| PATENT NO. | : 8,985,283 B2 | |
| APPLICATION NO. | : 13/574116 | |
| DATED | : March 24, 2015 | |
| INVENTOR(S) | : Yusuke Oshio et al. | |

It is certified that error appears in the above-identified patent and that said Letters Patent is hereby corrected as shown below:

Title page, item (73) Assignees, second Assignee, replace "Toyoto Jidosha Kabushiki Kaisha, Toyota-Shi, Aichi (JP)" with --Toyota Jidosha Kabushiki Kaisha, Toyota-Shi, Aichi (JP)--

Signed and Sealed this
Sixth Day of October, 2015

Michelle K. Lee
*Director of the United States Patent and Trademark Office*